United States Patent [19]
Cree

[11] Patent Number: 5,310,329
[45] Date of Patent: May 10, 1994

[54] AIR SHROUD DEVICE FOR A BLOWN FILM EXTRUSION LINE

[76] Inventor: Robert E. Cree, 127 Bartle Ave., Newark, N.Y. 14513

[21] Appl. No.: 831,673

[22] Filed: Feb. 5, 1992

[51] Int. Cl.$^5$ .......................................... B29C 55/28
[52] U.S. Cl. .................................. 425/72.1; 425/140; 425/326.1; 425/387.1
[58] Field of Search ................. 425/72.1, 326.1, 387.1, 425/140, 141

[56] References Cited

U.S. PATENT DOCUMENTS

| | | | |
|---|---|---|---|
| 2,337,927 | 12/1943 | Reichel et al. | 425/66 |
| 3,008,186 | 11/1961 | Voigt | 425/326.1 |
| 3,167,814 | 2/1965 | Corbett | 425/72.1 |
| 3,307,218 | 3/1967 | Reifenhauser | 435/72.1 |
| 3,456,044 | 7/1969 | Pahlke | 264/25 |
| 3,499,064 | 3/1970 | Tsuboshima et al. | 264/40.3 |
| 3,548,042 | 12/1970 | Hinrichs | 435/72.1 X |
| 3,568,252 | 3/1971 | Masuda et al. | 425/72.1 |
| 3,775,523 | 11/1973 | Haley | 264/569 |
| 3,888,609 | 6/1975 | Saint Eve et al. | 425/72.1 |
| 3,976,732 | 8/1976 | Herrington | 264/237 X |
| 4,061,707 | 12/1977 | Nohtomi et al. | 425/445 X |
| 4,201,741 | 5/1980 | Pannenbecker | 264/40.1 |
| 4,330,501 | 5/1982 | Jones et al. | 264/566 |
| 4,399,094 | 8/1983 | Fujitani et al. | 264/566 |
| 4,434,129 | 2/1984 | Bose | 264/564 X |
| 4,478,564 | 10/1984 | Shinmoto | 425/72.1 |
| 4,479,766 | 10/1984 | Planeta | 264/564 X |
| 4,632,801 | 12/1986 | Dowd | 264/566 |
| 4,678,417 | 7/1987 | Upmeier | 264/565 X |
| 4,699,580 | 10/1987 | Co | 425/72.1 |
| 4,750,874 | 6/1988 | Keim | 425/72.1 |
| 4,784,590 | 11/1988 | Halter | 425/72.1 |
| 4,818,467 | 4/1989 | Audureau et al. | 425/72.1 X |
| 4,826,414 | 5/1989 | Planeta | 425/72.1 |

FOREIGN PATENT DOCUMENTS

304140  7/1971  U.S.S.R. ............... 425/72.1

*Primary Examiner*—Richard L. Chiesa
*Attorney, Agent, or Firm*—Fish & Richardson

[57] ABSTRACT

An air shroud device for use in a blown film extrusion line. The blown film extrusion line is of the type which includes a heated extruder for melting and pressurizing a flow of molten plastic resin, an annular die through which the molten resin extrudes and from which it is pulled away along an axis in the form of an expanding bubble, and at least one air cooling ring mechanism defining a plenum surrounding the base of the bubble and having an annular outlet constructed to direct at least one stream of primary cooling air into cooling contact with the base region of the bubble, to flow along the bubble in the direction of film travel, causing the resin to cool as the film expands until a substantially fixed maximum bubble diameter is achieved at a frost line spaced from the annular die. The air shroud device includes an annular air shroud plenum having an annular air outlet, the air shroud device is constructed and arranged to be disposed at a level below the frost line and adjacent to the level of the air cooling ring. The shroud device is coaxial with the film line axis and of relatively large size so that its outlet mechanism is spaced substantially radially outward from the bubble and from the air cooling ring outlet.

19 Claims, 9 Drawing Sheets

AIR SHROUD DEVICE FOR A BLOWN FILM EXTRUSION LINE

BACKGROUND OF THE INVENTION

The present invention relates to means to improve the quality of film produced by a blown film extrusion line.

As plastic resin is extruded from a heated extruder having an annular die, the molten plastic resin is pulled away along the die axis in the form of an expanded bubble. After the resin cools to a set diameter as a result of application of cooling air by an air cooling ring, the bubble is collapsed and passes into nip rolls for further manufacturing steps.

As the film is extruded, thickness variations occur about the circumference of the bubble. It is recognized that these variations are caused by the melting, forming and cooling processes which are carried out by the extruder and its screw, the die and the air ring, respectively, as well as by variations in the amount of cooling that the film receives as it expands and is pulled toward the nip rolls.

In general, the thickness variations create problems for subsequent downstream conversion equipment such as printing presses, laminators, or bag machines. In processes where the film is wound onto a roll prior to converting, the thicker areas can build up on top of each other and thereby create hills and valleys on the rolled surface. Uneven rolls can further reduce the effectiveness of the downstream equipment. Any slack or tightness originally associated with gauge variations are magnified.

The tension variation across the film can also create creases in the film which can subsequently affect other processes. For example, in a printing press, ink will not transfer to the film on the inside of a crease and thus the quality of the finished product is degraded. In bag machines, if a crease happens in a location where a seal is placed, the seal will be defective. Further, the seal and perforation quality in the film is highly dependent on film tension and thickness and therefore any unexpected variations can result in poor quality. To avoid these problems, blown film manufacturers have used spreader rolls or other means to eliminate creases. These means complicate and slow down the manufacture of the finished product.

It is generally desired to obtain high quality film during the extrusion process so that the downstream equipment can be run faster and obtain higher quality products. Manufacturing processors have recognized that by eliminating gauge variation (film wall thickness) during the extrusion process, one is able to obtain higher quality film products.

Manufacturing processors primarily rely on equipment suppliers to provide extruders, screw and die design technology to limit gauge variations. This typically yields an average of + or −5 to 10% variations in gauge directly attributable to the processing equipment. These variations take the form of several equally spaced gauge bands or port lines around the circumference of the plastic film tube. The number of bands directly relates to the number of flow channels within the die. The magnitude of variation for each band is related to how well the plastic melt is distributed by its associated flow channel. This varies from channel to channel since the melt viscosity entering the die is typically nonuniform and is a function of the extruder and die design. Another form of die related variation can be caused by non-uniform annular gaps or lips through which the polymer exists. These gaps are usually adjustable and depend on the manufacturing operator's skill and feedback control to minimize associated thickness variations.

The magnitude of port line variation can be modified and reduced by proper application of a cooling system. It is understood that the shape a bubble takes during the cooling process significantly impacts a film property such as gauge variation associated with the melting and forming equipment. There are several cooling systems which serve to shape the bubble to shapes other than that which would occur without any influence.

One such method involves stacking multiple air rings on top of each other which are spaced apart and encompass and shape the bubble. This design has a significant disadvantage in that the stacked air rings seriously narrow the range of bubble diameters and thus film widths that can be produced when compared with a standard single ring process. If sizes outside of the operating range of the stacked air rings are desired, the line must be shut down and the equipment must be changed to accommodate the different size film width. Another disadvantage occurs during start up of the extrusion line when direct access to the die area is required so that the processor can reach the molten film issuing from the lips. Stacked air rings such as discussed above, significantly impair this access.

Another known cooling method involves placing fixed diameter plates or irises a distance above and generally sealed to the air ring. The bubble runs inside a sealed chamber up to an open plate/iris diameter (bubble diameter typically runs approximately two inches smaller). As plate/iris diameter changes are made, the bubble follows it and changes shape. The disadvantage of such plates/irises is that significant turbulence is induced as air flows through the gap between the plate/iris and the bubble which degrades stability especially at diameters that alter the natural shape of the bubble. A further disadvantage of this method is that the plate/iris has limited access to the die lips during line start-up.

Cooling equipment also causes film thickness variations which add to those from the melting and forming equipment. A most significant variation is when non-uniform air is drawn into the cooling air stream from the surrounding atmosphere adjacent the extrusion line. Atmospheric air is non-uniform in many properties including temperature, flow, and humidity, since there are large, high temperature equipment which are used in the process. The heat which discharges from this equipment affects the air surrounding the extruded resin and can cause thickness variations of + or −15%. These variations occur since large volumes of air are aspirated from the atmosphere by high velocity air exiting from the cooling ring adjacent the base of the bubble.

A further cooling problem exists based on the time of day as well as seasonal variations in ambient atmospheric conditions. These significantly impact the operation of a line and especially affect the throughput rate which can change by 10% or more. Presently, manufacturers have had only limited success in controlling ambient air variation. The crudest and most widely practiced attempt at controlling ambient air variation is by the use of fans and barriers placed strategically around the process to compensate for temperature variations.

The main problem with this approach is that the ambient conditions are constantly changing requiring barrier and fan repositioning. Additionally, seasonal changes are not compensated at all. The diameter plate/iris chambers also have limited success in controlling atmospheric variation of this type since a portion of the molten film remains outside of the influence of the chamber and ambient air is aspirated into the exiting air stream.

A further method previously employed to control ambient air variation is by physically enclosing the process starting from the top of the air ring and extending upward for several feet. This approach has varying degrees of success since these systems do not seal at the top of the bubble. Ambient air is typically drawn over the top and is aspirated into the cooling air stream. An additional problem is that this approach limits access of personnel to the film during line start-up.

More sophisticated systems actively measure the gauge of the film on-line through closed loop control of localized die lip temperature or the air flow just above the die lips. These systems typically attempt to compensate for film thickness variations. The major drawback of the system is that gauge corrections depend on the accuracy of the on-line gauge sensor, any misreading of the actual thickness will cause an inaccurate correction and hence will result in film of unacceptable quality. These systems are also complex and expensive and require significant training of manufacturing operators and maintenance crews.

SUMMARY OF THE INVENTION

According to the present invention an air shroud device is provided for use in a blown film extrusion line. The blown film extrusion line is typically of the type comprising a heated extruder for melting and pressurizing a flow of molten plastic resin, an annular die through which the molten resin extrudes and from which it is pulled away along an axis in the form of an expanding bubble, and at least one air cooling ring device defining a plenum surrounding the base of the bubble and having an annular outlet arrangement constructed to direct a stream or streams of primary cooling air into cooling contact with the base region of the bubble, to flow along the bubble in the direction of film travel and cause the resin to cool as the film expands until a substantially fixed maximum bubble diameter is achieved at a frost line spaced from the annular die.

The air shroud device according to the invention comprises an annular air shroud plenum having an annular air outlet, the air shroud device constructed and arranged to be disposed at a level below the frost line and adjacent to the level of the air cooling ring. The shroud device is coaxial with the film line axis and of relatively large size so that its outlet mechanism is spaced substantially radially outward from the bubble and from the air cooling ring outlet. The air shroud plenum is adapted to receive air from a source uninfluenced by variable conditions at the extrusion line, and the air shroud device is arranged to provide a diffused source of the air about the bubble to serve as pseudo-ambient air. The air shroud device is such that secondary air flow induced at points about the bubble by primary flow of cooling air from the air cooling ring comprises air drawn from the spaced apart air shroud device and not from ambient air adjacent the extrusion line that is subject to variations. The invention includes the air shroud device in combination with the extrusion line and the air shroud per se.

Various preferred embodiments have one or more of the following features of the invention.

The air shroud features a means to adjustably vary the pressure conditions of air that exits the shroud plenum, e.g., to control the shape of the melt region of the bubble. Preferably for this feature, the annular air outlet of the air shroud plenum includes at least two levels of outlets spaced apart in the direction along the film line axis for providing respective spaced apart annular air flows at different levels of the bubble, and the means to adjustably vary the air pressure includes a mechanism to vary the pressure of air exiting at one outlet level relative to the pressure of air exiting at the other outlet level. In one preferred case the outlet for one of the levels is disposed in a side surface of the plenum and the outlet for the other level is disposed in an upper surface of the air shroud plenum facing in the direction of film travel, and the mechanism to vary the relative air pressure includes a movable air flow adjusting plate associated with the upper surface which includes structure to selectively vary the effective air-flow cross section of the outlet in the upper surface. In this case, preferably a pivotally mounted adjusting lever connected to the air flow adjusting plate is provided in a manner to enable movement of the air flow adjusting plate for varying the effective cross section of the respective outlet.

The air shroud device features annularly arranged air outlets at a plurality of levels disposed in a side surface facing inward toward the bubble, outlets at different levels having respective flow axes that have differing angular orientations relative to the film line axis. Preferably, the outlets in each of the levels comprise a series of drilled holes in a wall of the air shroud plenum.

The air shroud device preferably is constructed and arranged, so that while it is in place, it enables substantially unobstructed access to the annular die and the air cooling ring. The air shroud device is also preferably constructed to rest directly on an outer portion of the plenum of the air cooling ring mechanism. The purpose of resting the air shroud device on the outer portion of the plenum is that it allows the air shroud device to remain stationary with the plenum for connection with air supply hoses while allowing the inner portion of the primary air ring to rotate or oscillate with such dies.

In another aspect of the present invention the air shroud plenum has first and second outlet passages through which the pseudo-ambient air can emerge, the first outlet passage being directed to supply the secondary air for flow paths in directions having radial inward components relative to the bubble and the second outlet passage being directed at a substantial angle to the orientation of the first outlet passage in the manner to supply secondary air for flow paths that are generally parallel with the film line axis.

In preferred embodiments, the air outlets of the air shroud plenum are spaced radially outward from the base region of the bubble a distance of at least six inches and preferably one foot.

Also, in various preferred embodiments the spacing between the air shroud device and the bubble is sufficiently large in the presence of the combined flows from the air cooling ring of the extrusion line and the air shroud device to prevent air acceleration and related bernoulli effects from creating any substantial tendency for the bubble to be drawn outwardly toward the air shroud device.

Furthermore, in preferred embodiments, the air outlets of the air shroud device are sized to supply a substantial volume of air adequate to meet the flow inducing effects of the cooling air flow from the air cooling ring; preferably the aggregate flow of the outlets of the air shroud device is at equal to the aggregate flow of the outlet means of the cooling ring device.

BRIEF DESCRIPTION OF THE DRAWINGS

FIG. 3 is a partial cross sectional side view.

DETAILED DESCRIPTION OF THE PREFERRED EMBODIMENTS

Figure 1:
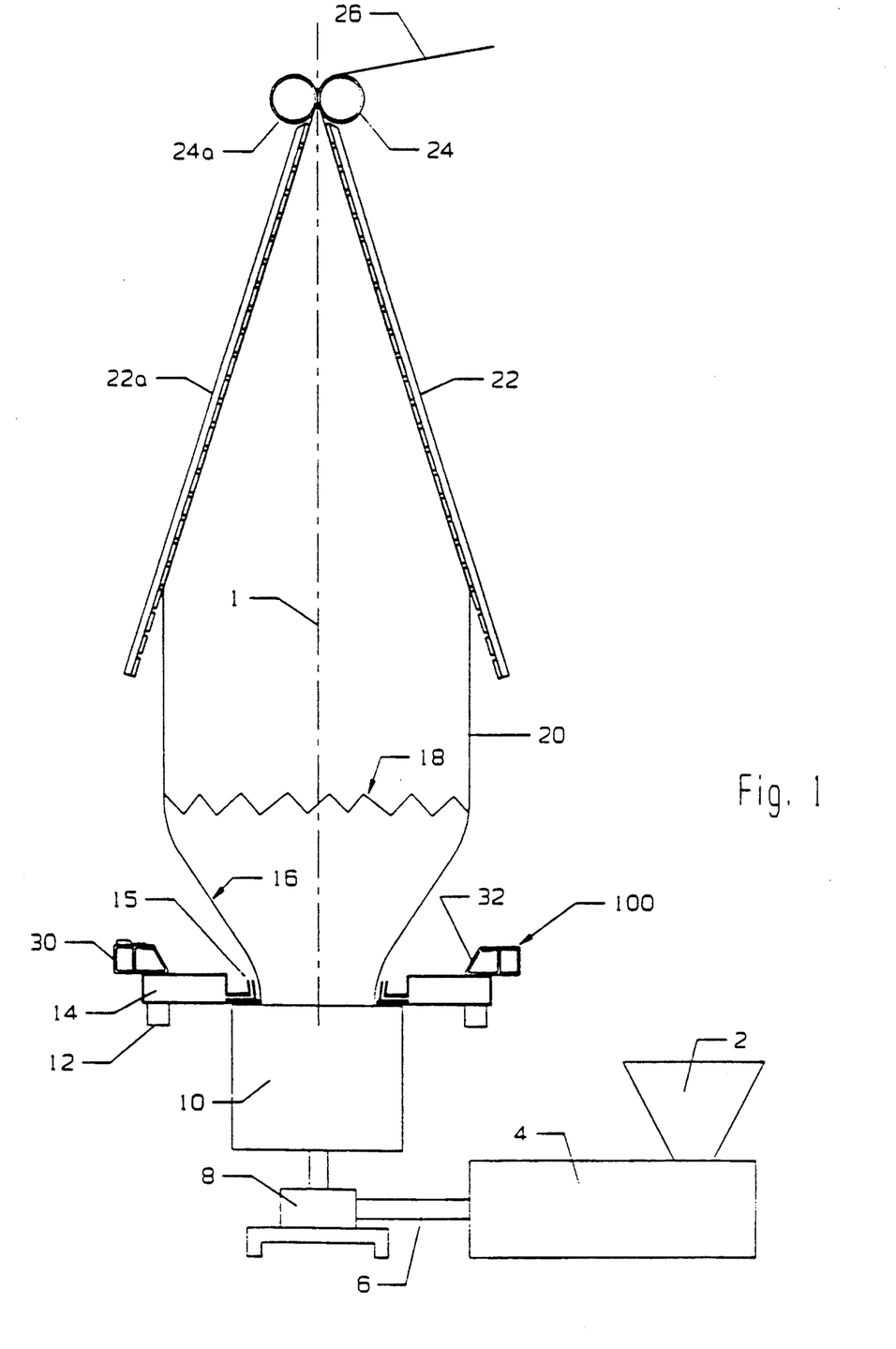
FIG. 1 is a schematic side view of the blown film extrusion apparatus including the air shroud device according to an embodiment of the present invention.

FIG. 1 illustrates extrusion of molten plastic resin from an extrusion line. Plastic pellets are fed into a feed hopper 2 and are transferred into an extruder 4 where they are melted, mixed and pressurized by the action of an extruder screw. The melt exits extruder 4 and is conveyed through melt pipe 6 to die block 8 where it is conveyed upward and into the bottom of blown film die. An annular plastic melt 16 is then extruded from the die orifice at the top of die 10 and is continually drawn to form a cooled, solidified plastic tube 20. Air captured within the tubular extrusion causes the film to form a bubble which enlarges as it progresses from the die until it reaches the frost line.

Primary cooling air for the process is supplied to air ring plenum 14 and is applied to contact the extruding plastic melt adjacent the base portion of the bubble in annular streams formed by air ring lips 15. Concentric with and spaced outwardly from the cooling ring is an air shroud device 100 which includes an outer plenum 30 connected to an inner plenum 32. The air shroud device 100 provides the diffused source of controlled air which the primary cooling air that exits lips 15 can aspirate.

The arrangement of the large, outlying air shroud device 100 enables excellent access to the die and cooling ring from the top and sides without interference with the bubble path during process start-up and even while the process is running. This is because the air shroud device 100 is located outwardly at the shown substantial distance from the melt region of the bubble and does not extend vertically any substantial distance. (In this preferred embodiment the level of the top of the shroud plenum lies at a distance from the die no more than about ⅓ the distance between the die and the frost line.)

The plastic melt 16 is cooled sufficiently, primarily by the air from the cooling ring, to solidify into tube 20 at frost line 18. The tube 20 is continually drawn upward through collapsing frame 22, 22a where it remains as a tube for further processing or is converted into a flat sheet of film 26, also known as "layflat," as it passes through a nip between rubber roll 24a and steel roll 24. These nip rolls are driven to continually pull the film through this extrusion process.

Figure 2:
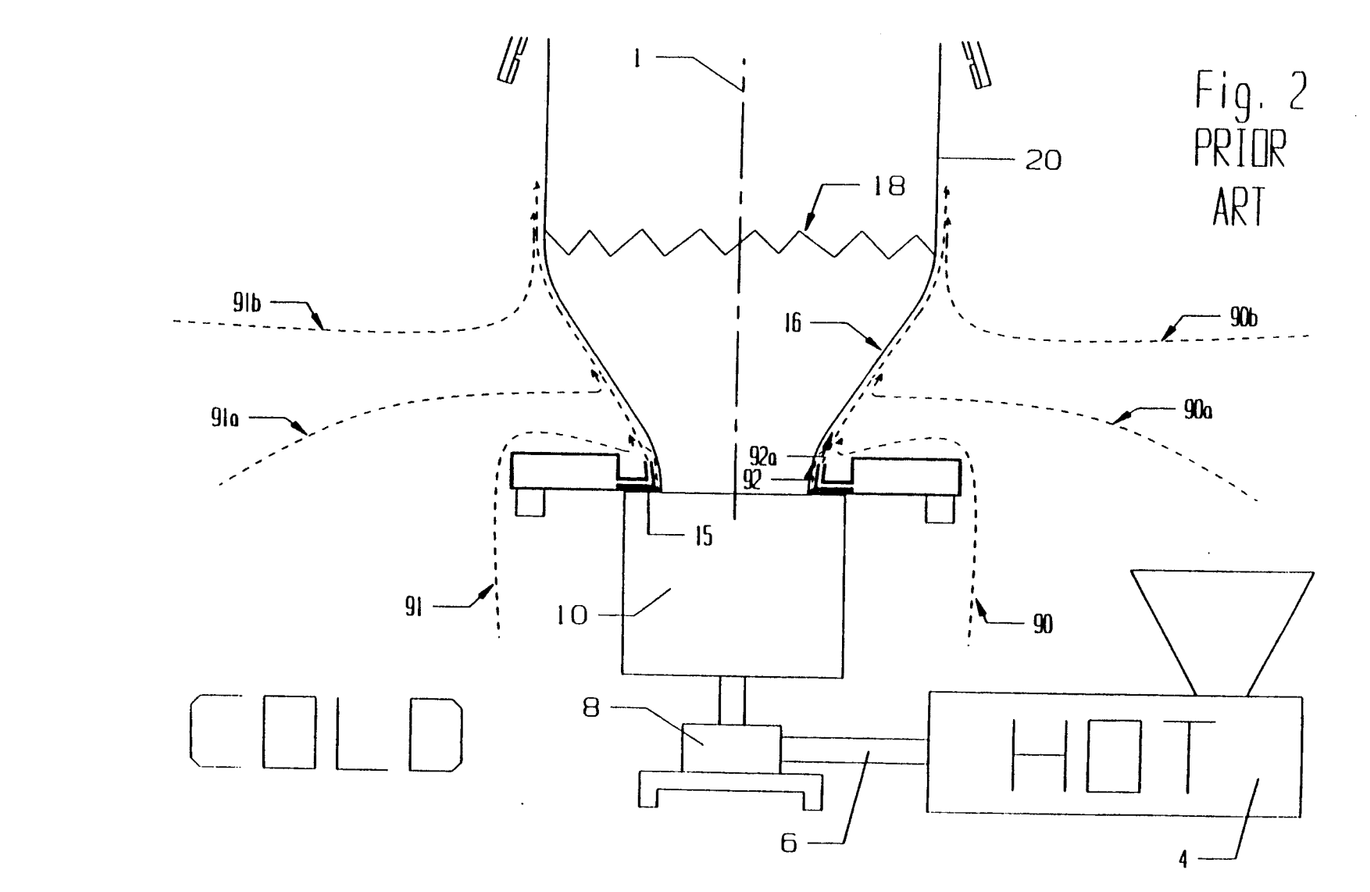
FIG. 2 is a schematic side view showing the blown film extrusion apparatus known in the prior art and illustrating the effects of ambient air on the melt region of the bubble.

FIG. 2 is an enlarged scale figure of a prior art apparatus that produces blown film with an extrusion line. This device is labelled with similar reference numerals for similar parts as in FIG. 1. The melted plastic is formed, as described in connection with FIG. 1, through an extruder 4, melt pipe 6, die block 8 and annular die 10. A first primary cooling air stream from plenum 14 indicated by reference numeral 92 exits the lower portion of lips 15 and is aspirated into the main primary cooling air stream 92a exiting the plenum 14 through the upper portion of the lips 15. Above lips 15 ambient air is aspirated inward in secondary streams 90, 90a, 90b, 91, 91a and 91b toward the central axis 1 of the bubble by the primary cooling air stream. As shown, ambient air 90, 90a and 90b originates from the region of the hot extruder 4 and is much warmer than ambient air 91, 91a and 91b originating from cooler surroundings and entering at respectively similar levels on the other side of the machine. The air streams 91, 91a and 91b are cooler because there is no heat exchange occurring with the extruder machine in this region. This difference in temperature between the air streams on different sides of the bubble gives rise to non-uniform temperatures in the cooling air around the circumference of the bubble. This cools the melt 16 differently in different regions which, we have observed, affects the biaxial stretching occurring in the drawing process to produce detrimental thickness variations about the circumference which become solidified in the film 20 across frost line 18.

Figure 2A:
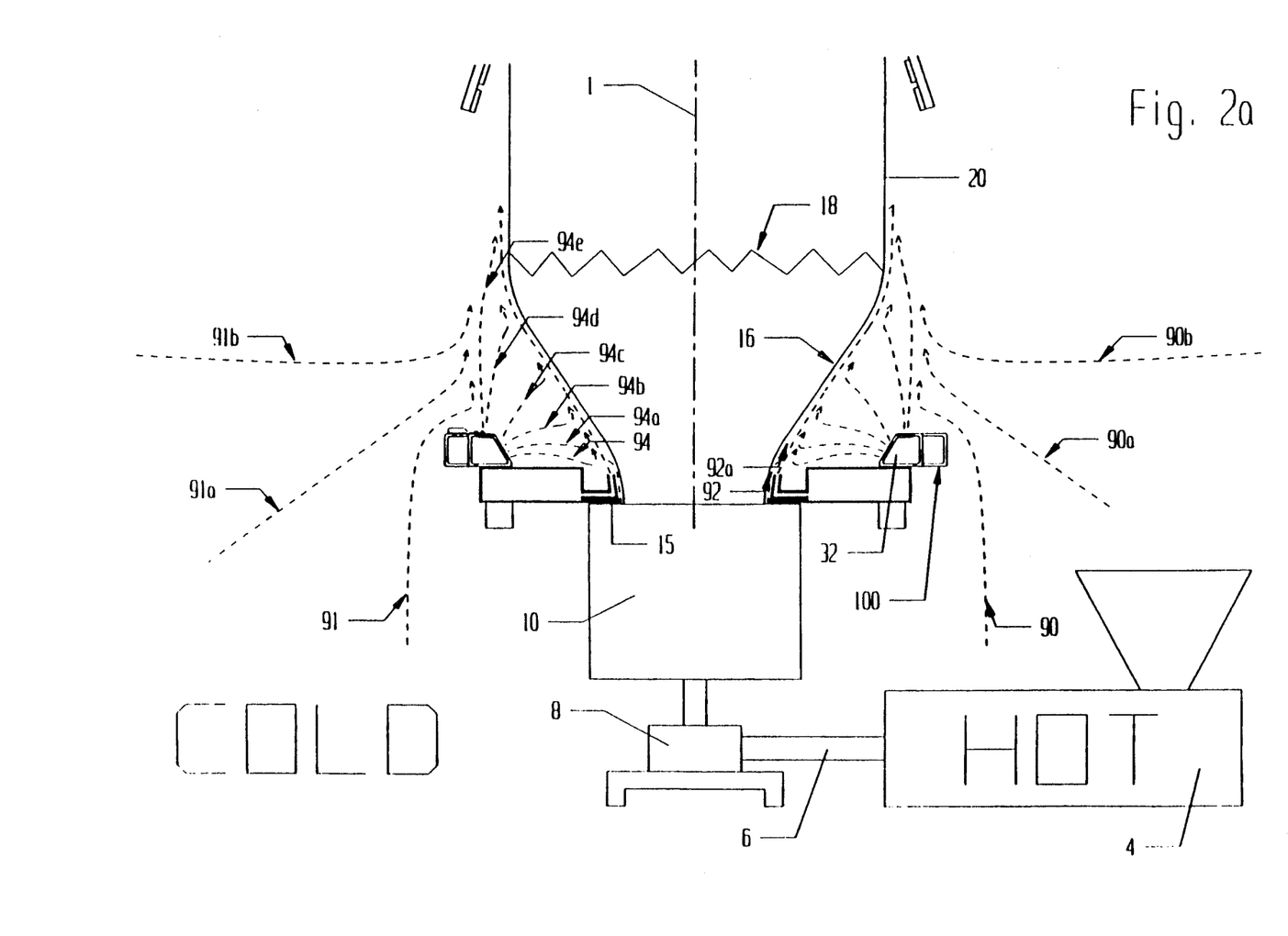
FIG. 2a is a schematic side view which is on an enlarged scale relative to FIG. 1, and illustrates the air flow from the air shroud device of the present invention and its effect on ambient air flow surrounding the extrusion line.

FIG. 2a incorporates the air shroud device 100 of FIG. 1, according to the present invention. The air shroud device 32 is disposed radially outwardly, resting on top of the primary cooling air plenum 14 in substantially sealed relationship. The primary cooling air stream 92, 92a aspirates the same volume of air as in FIG. 2 except in this case the secondary air is drawn from the surrounding air shroud device 100 as "pseudo-ambient" air rather than from the ambient surrounding atmospheric air. Secondary air streams 94, 94a, 94b, 94c, 94d and 94e, of uniform conditions are created by shroud plenum 32 and the aspiration effects of the primary cooling air stream 92 and 92a, to uniformly surround the circumference of melt 16. Because the air streams 94, 94a, 94b, 94c, 94d and 94e thus supply uniformly controlled air to the area surrounding the melt region of the bubble, no thickness variations in melt 16 are induced by ambient air effects, and the resulting film 20 solidifying at frost line 18 is free of such defects.

The spacing between the air shroud device and the bubble is sufficiently large in the presence of the primary cooling flow from the air cooling ring or rings combined with the secondary air from the shroud device to prevent air acceleration and related bernoulli effects from creating any substantial tendency for the bubble to be drawn outwardly toward the air shroud device. Further, the outlets of the air shroud device are sized to supply a substantial volume of air adequate to meet the flow-inducing effects of the air from the air cooling device. The air shroud device is therefore spaced from the base region of the bubble by at least six inches, and, as shown in normal operation preferably the shroud device is spaced approximately one foot from the base region of the bubble.

Figure 3:
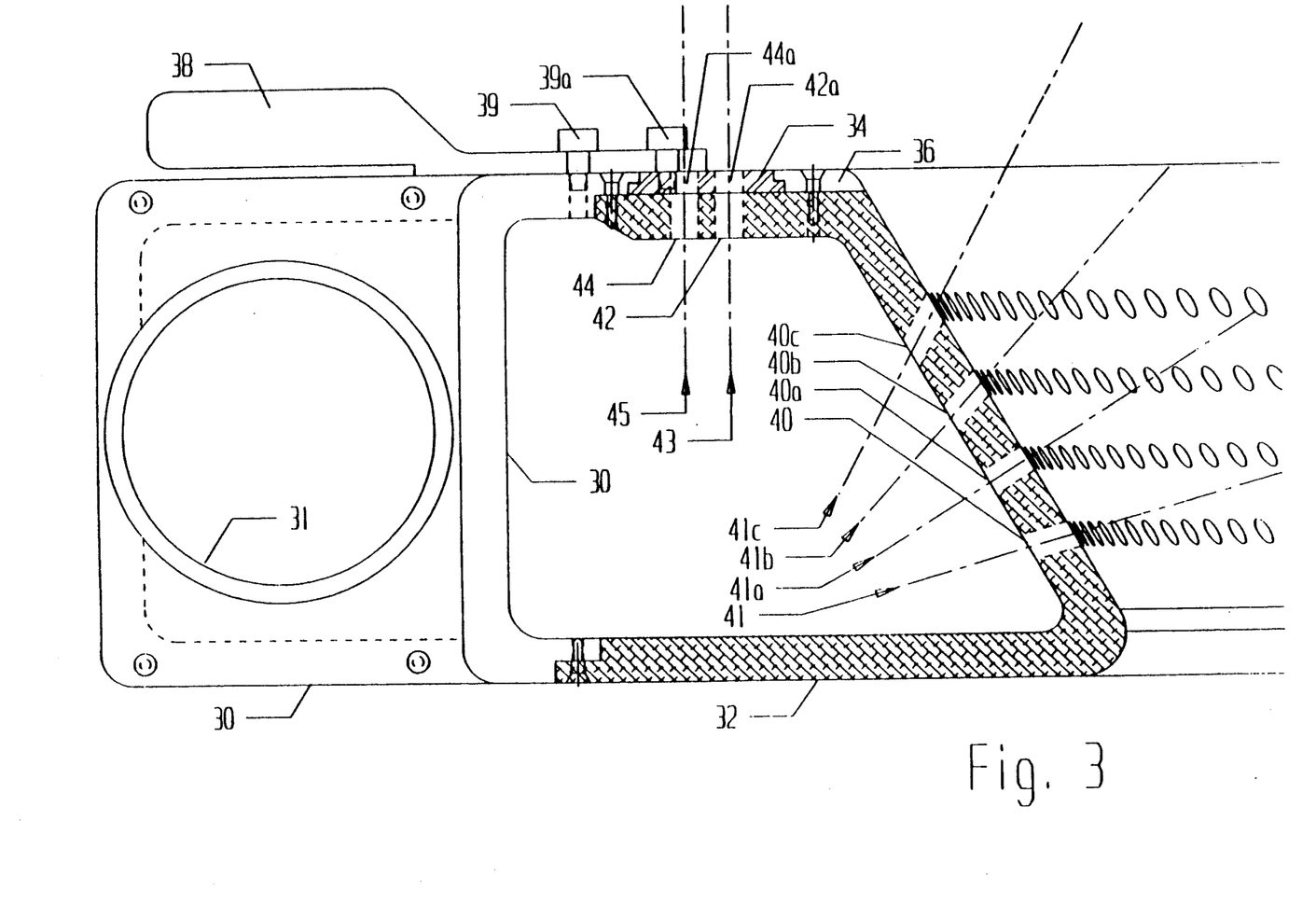

FIG. 3 is a cross sectional view of the air shroud device of FIG. 1. This Figure shows at successive levels, respective annular sets of outlet holes in an inclined side surface of the inner plenum 32 which faces the bubble. The air under pressure enters through an inlet or inlets 31 through an outer plenum 30 which distributes the air around the circumference of inner plenum 32. Air exits inward toward melt 16 through holes 40, 40a, 40b, 40c, 42 and 44 as air streams 94, 94a, 94b, and 94c, 94d and 94e are drawn toward the bubble as shown in FIG. 2a. To achieve the desired diffuse distribution, the axes 41, 41a, 41b and 41c, of holes 40, 40a, 40b and 40c, through the side wall of inner plenum 32 are respectively disposed at different, successively decreasing angles to axis 1. This allows the air flows exiting the plenum 32 to be directed towards different annular areas of the melt region of the bubble.

Annular sets of holes 42 and 44 can be covered to a selected degree by an air flow adjusting plate 34 drilled with a matching hole pattern 42a and 44a, to create the air flows 94d and 94e seen in FIG. 2a. Selected variation in the amount of air exiting the plenum of this region can have, e.g., the effects described below in respect of FIGS. 5, 5a, and 5b.

The plate 34 slides around central axis 1 and is retained by a portion of the outer plenum 30 and a retainer plate 36. As the holes 42a, 44a align and misalign with holes 42, 44, the exit volume of the air flows 94d, 94e is changed by changing the effective flow cross section through these holes.

An adjusting lever 38 is pivotally disposed about a shoulder bolt 39 which is attached to the air shroud outer plenum 30. The adjusting lever 38 pushes on a shoulder bolt 39a which is screwed into air flow adjusting plate 34 and allows fine adjustments to be made to the resulting air flows 94d and 94e. The result of this adjustment modifies the pressure profile along the melt region 16 of the bubble.

Referring further to FIG. 2a, natural ambient air flows 90, 90a, 90b, 91, 91a and 91b continue to be drawn inward toward the moving film by flow 94e. These natural ambient flows mix with air flow 94e and are directed upward where they mix with the cooling air flow, but this occurs above the frost line 18 where the film has solidified, hence there is no effect on the gauge (wall thickness) of tube 20.

The present arrangement is one example of a means for adjusting the air flow from the air shroud device. It is contemplated that other systems can be designed which create the desired air flow pattern. Other arrangements involving perforated or slotted plates can be used and are within the scope of this invention. Further it is possible to arrange an air flow adjusting plate similar to plate 34 on the side surface of the inner plenum 32 whereby the flow through one or more of the series of annular outlets can be modified relative to another set of outlets. It is similarly possible to employ one or more annular discharge slots in place of respective rows of outlet holes and to provide means for selectively varying the flow cross section of such slots as desired.

Figure 4:
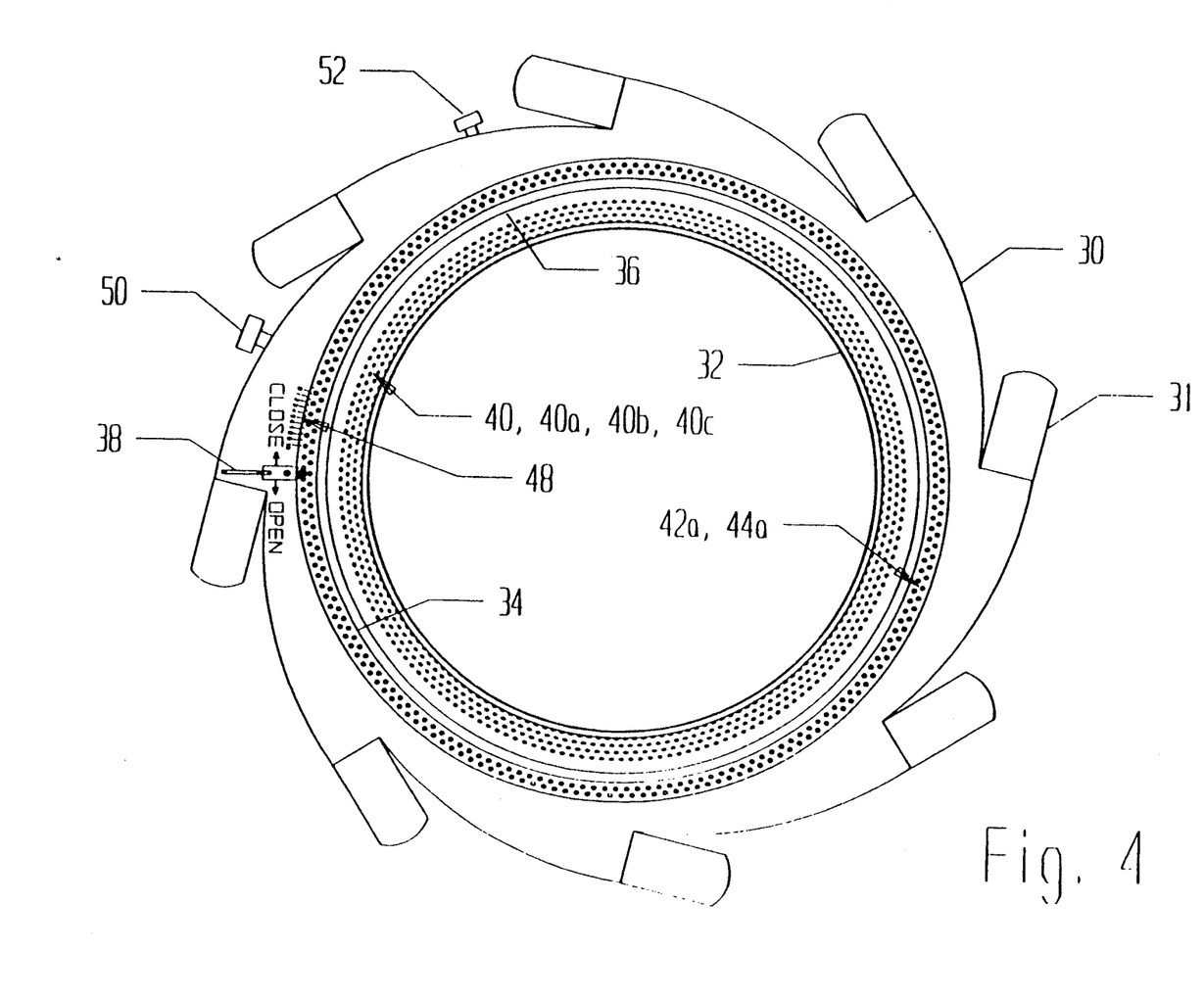
FIG. 4 is a plan view of the air shroud device of FIG. 1.

FIG. 4 is a plan view of the air shroud device of FIG. 1. Air inlets 31 are shown at multiple radial locations around the outer plenum 30. The inner plenum 32 is concentrically mounted within the outer plenum 30 and has the multiplicity of exit holes, 40, 40a, 40b, 40c around its inner circumference. The air flow adjusting plate 34 is shown together with holes 42a and 44a arranged radially outward of the retainer plate 36. The air adjusting lever 38 is capable of being accurately located with use of a vernier 48.

As seen in FIG. 4, the air shroud device includes an air pressure gauge 50 and a temperature gauge 52. By use of pressure and temperature data obtained from these sensors in adjusting suitable air pressure and air temperature control devices, the capability is obtained of replicating desired conditions within the air shroud device to achieve reproducibility according to preestablished operational criteria.

Figure 5:
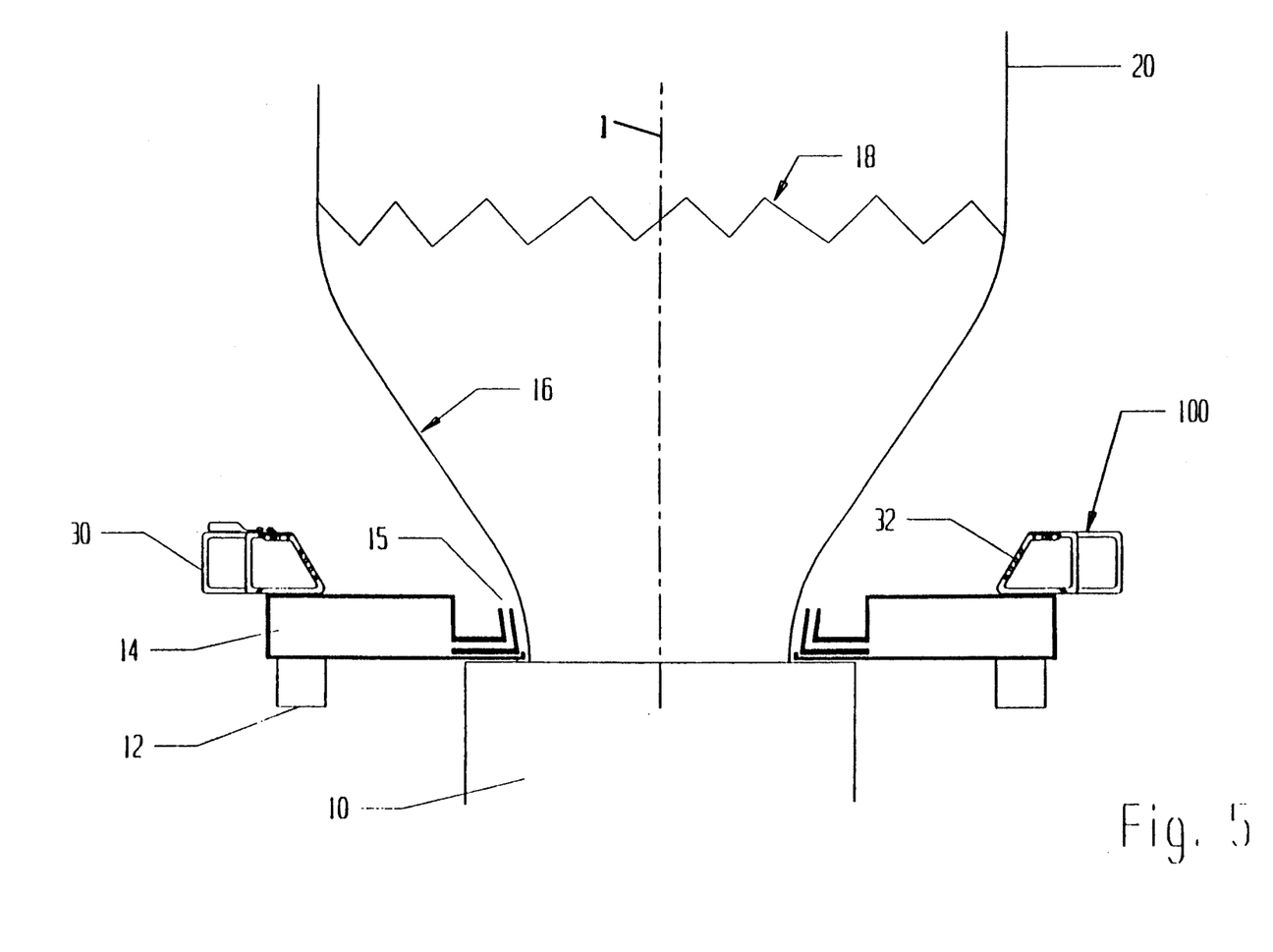
FIG. 5 is a schematic side view illustrating the extrusion device and the melt region of the bubble wherein the melt region assumes a normal bubble shape.
Figure 5A:
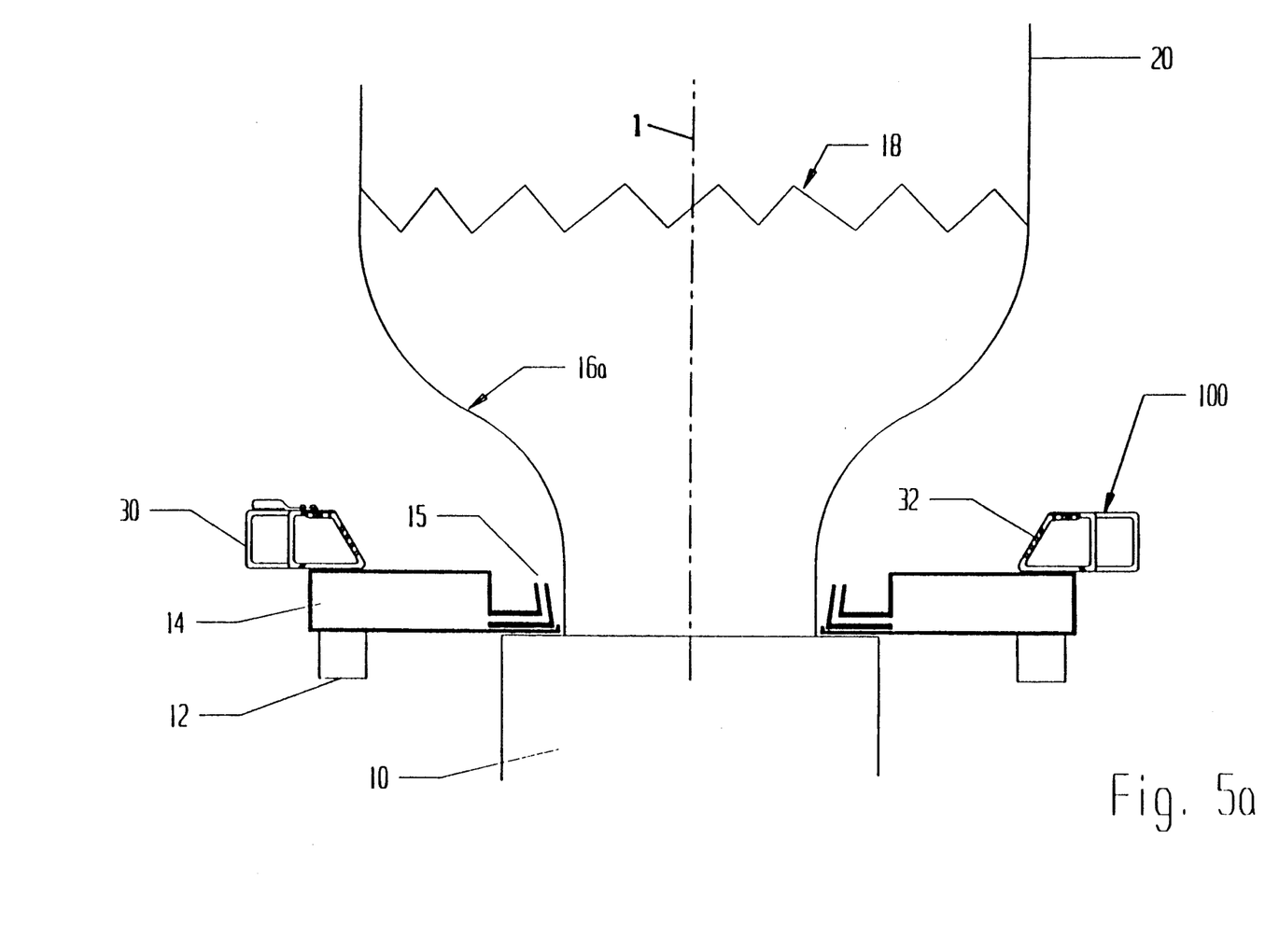
FIG. 5a is a schematic side view illustrating the extrusion device and the melt region of the bubble wherein the melt region is caused by the air shroud device, to have a stalked bubble shape.
Figure 5B:
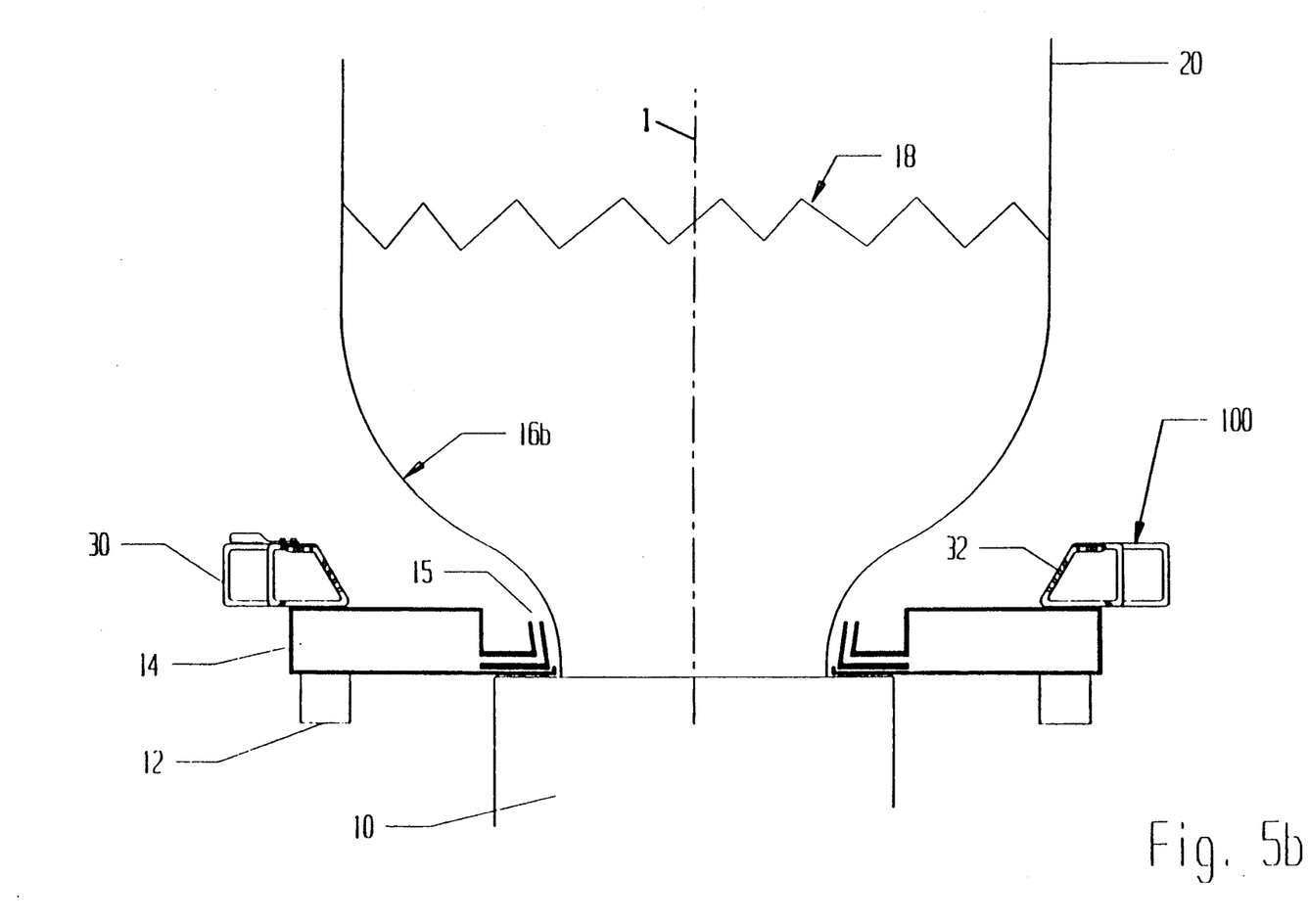
FIG. 5b is a schematic side view illustrating the extrusion device and the melt region of the bubble wherein the melt region is caused by the air shroud device, to have a squatty bubble shape.

FIGS. 5, 5a and 5b show the effect of different pressures in the air flow streams exiting the holes 42 and 44 when the air flow adjusting plate 34 is moved into different positions. Specifically, FIG. 5 illustrates the shape of the bubble when an intermediate pressure is exiting from the holes in the upper surface of the air shroud device. Further FIG. 5a illustrates a bubble shape which has been termed "stalked". This bubble shape is substantially narrower in its lower portion of the melt region as it extends upward and then widens into the maximum diameter along the frost line. This bubble shape is achieved by a very low flow rate exiting from the upper surface of the air shroud device.

FIG. 5b illustrates a bubble shape which has been termed "squatty". This bubble shape has a very short neck region as it immediately widens out upon passing the lips 15 and the maximum bubble diameter is achieved prior to the frost line 18. This bubble shape is achieved by a higher flow rate out of the upper surface of the air shroud inner plenum 32 than that of FIG. 5. The correct settings depend upon the amount of primary cooling flow present, which in turn depends upon the construction and settings employed for the cooling air ring. Upon selection of these parameters, the appropriate settings for the air shroud device for the different conditions of FIGS. 5, 5a, and 5b can be readily determined by a set of empirical evaluations.

Figure 6:
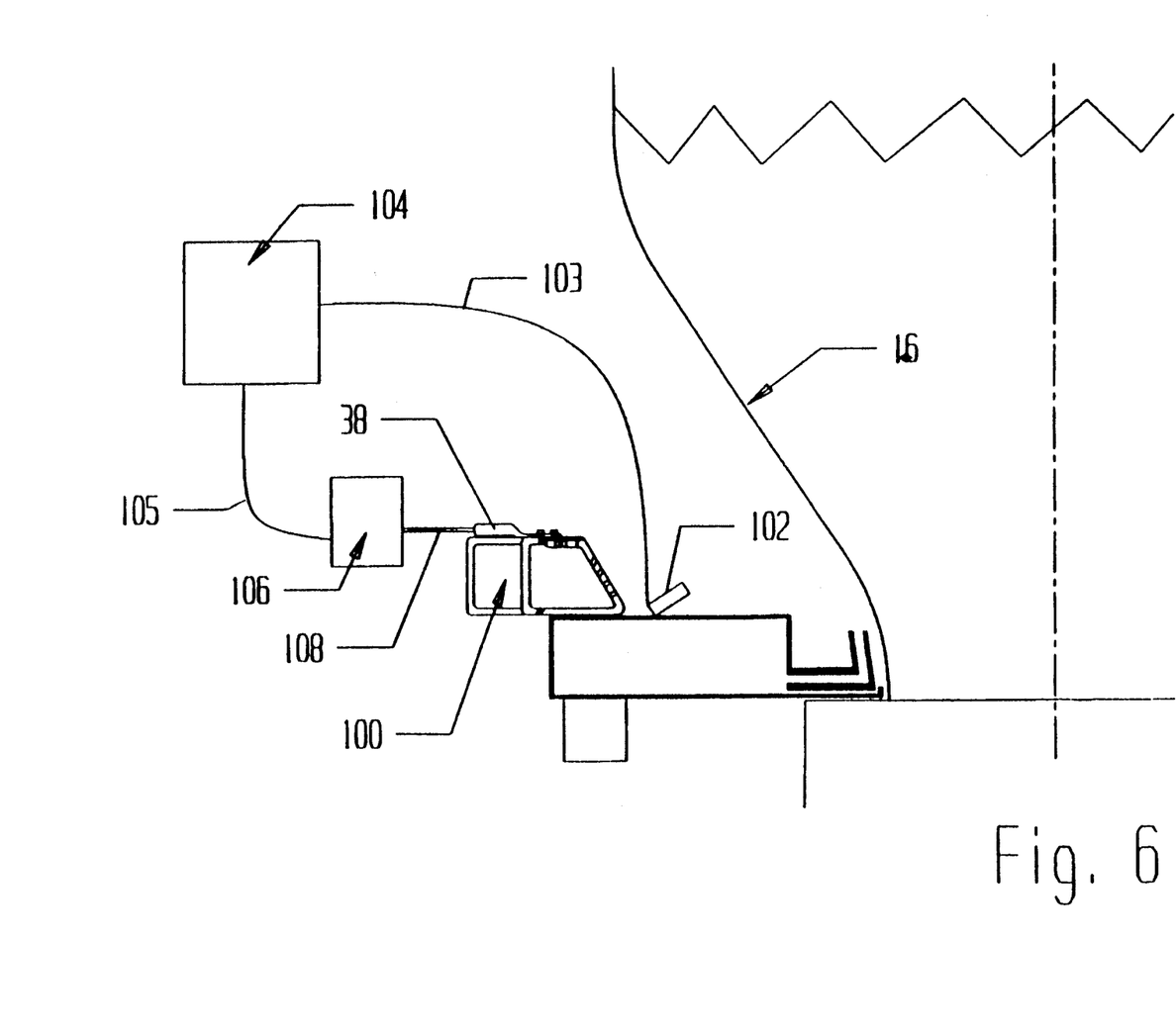
FIG. 6 is an enlarged schematic side view illustrating another embodiment of the present invention showing a closed loop feedback system for controlling the shape of the bubble.

FIG. 6 illustrates that the air flow from the air shroud device is adjustable using a closed loop system. This system employs a sensor 102, such as an ultrasonic distance transducer or a pressure transducer, for determining the shape of the bubble and then providing a feedback signal via cable 103 to a computer controller 104. The computer then process the signal and sends a signal via cable 105 to an actuator 106. The actuator then operates a linkage 108 attached to the air flow adjusting lever 38 for varying the air flow and thus adjusting the shape of the bubble.

The present invention has been described in connection with certain structural embodiments and it will be understood that various modifications can be made to the above-described embodiments without departing from the spirit and scope of the invention as defined in the appended claims.

What is claimed is:

1. In combination an air shroud device and an air cooling means comprising at least one air cooling ring, said air shroud device and air cooling means constructed for use in a blown film extrusion line comprising a heated extruder for melting and pressurizing a flow of molten plastic resin and an annular die through which the molten resin extrudes and from which it is pulled away along an axis in the form of an expanding bubble, said air cooling means having annular cooling ring air outlet lips of predetermined given diameter for disposition closely adjacent to the path of the film, said annular cooling ring air outlet lips being constructed to direct at least one relatively high velocity stream of cooling air into cooling contact with the film in the base region of the bubble, to flow along the bubble in the direction of film travel, to cause the resin to cool as the film expands until a substantially fixed maximum bubble diameter is achieved at a frost line spaced from the annular die, said air shroud device being constructed for use in cooperation with said annular cooling ring air outlet lips of predetermined diameter and comprising an annular air shroud outlet means in combination with a source of circumferentially uniform air, said air shroud outlet means constructed and arranged to be disposed at a level below said frost line and coaxial with said film line axis, said annular air shroud outlet means being of substantially larger diameter than the diameter of said cooling ring air outlet lips so that said air shroud outlet means, when positioned in operative position, is spaced substantially radially outward from said annular cooling ring air outlet lips and the path of the film passing thereby, and said annular air shroud outlet means being so related to its said air source that, in operation, it provides a diffused, relatively low velocity mass of air surrounding the relatively high velocity flow of cooling air from said annular cooling ring outlet lips, whereby said movement induced from surrounding air by the directed flow of relatively high velocity cooling air from said cooling ring air outlet lips comprises uniform pseudo-ambient air drawn from the outlet region of said outwardly spaced annular air shroud outlet means.

2. A blown film extrusion line, comprising in combination:

a heated extruder for melting and pressurizing a flow of molten plastic resin, an annular die through which the molten resin extrudes and from which it is pulled away along an axis in the form of an expanding bubble, air cooling means comprising at least one air cooling ring, said air cooling means having annular cooling ring air outlet lips of predetermined given diameter disposed closely adjacent to the path of the film, said annular cooling ring air outlet lips being constructed to direct at least one relatively high velocity stream of cooling air into cooling contact with the film in the base region of the bubble, to flow along the bubble in the direction of film travel, to cause the resin to cool as the film expands until a substantially fixed maximum bubble diameter is achieved at a frost line spaced from the annular die, and an air shroud device constructed for use in cooperation with said annular cooling ring air outlet lips of predetermined diameter and comprising an annular air shroud outlet means in combination with a source of circumferentially uniform air, said air shroud outlet means constructed and arranged to be disposed at a level below said frost line and coaxial with said film line axis, said annular air shroud outlet means being substantially larger than the diameter of said cooling ring air outlet lips so that said air shroud outlet means, in operative position, is spaced substantially radially outwardly from said annular cooling ring air outlet lips and the path of the film passing thereby, and said annular air shroud outlet means being so related to its said air source that, in operation, it provides a diffused, relatively low velocity mass of air surrounding the relatively high velocity flow of cooling air from said annular cooling ring outlet lips, whereby air movement induced from surrounding air by the directed flow of relatively high velocity cooling air from said cooling ring air outlet lips comprises uniform pseudo-ambient air drawn from the outlet region of said outwardly spaced annular air shroud outlet means.

3. The device of claims 1 or 2, including means to adjustably vary the pressure conditions of air that exits said annular air shroud outlet means to control the shape of the melt region of the bubble.

4. The device of claim 3, wherein said annular air shroud outlet means includes at least two levels of outlets spaced apart in the direction along the film line axis for providing respective spaced apart annular air flows at different levels of the bubble, and said means to adjustably vary the air pressure includes means to vary the pressure of air exiting at one outlet level relative to the pressure of air exiting at the other outlet level.

5. The device of claim 4, wherein said annular air shroud outlet means for one of said levels is disposed in a side surface of said air shroud device and the annular air shroud outlet means for the other said level is disposed in an upper surface of said air shroud device facing in the direction of film travel, and said means to vary the relative air pressure includes a movable air flow adjusting plate positioned on said upper surface, said air flow adjusting plate including structure to selectively vary the effective air-flow cross section of said annular air shroud outlet means in said upper surface.

6. The device of claim 5, further comprising a pivotally mounted adjusting lever connected to said air flow adjusting plate in a manner to enable movement of said air flow adjusting plate for varying the effective cross section of the annular air shroud outlet means.

7. The device of claims 1 or 2 wherein said annular air shroud outlet means includes a plurality of levels of annular outlets disposed in a side surface facing inward toward said bubble, outlets at different levels having respective flow axes that have differing annular orientations relative to said film line axis.

8. The device of claim 7 wherein said outlets at each of said levels comprises a series of drilled holes in a wall of the air shroud device.

9. The device of claims 1 or 2, wherein said air shroud device is constructed and arranged, while in place, to enable substantially unobstructed access to the annular die and the air cooling means.

10. The device of claims 1 or 2, wherein said air shroud device is a separate member constructed to rest directly on an outer portion of said air cooling means.

11. The device of claims 1 or 2, wherein said air shroud device has first and second outlet means through which said pseudo-ambient air can emerge, said first outlet means being directed to supply secondary air for flow paths in directions having radial inward components relative to said bubble and said second outlet means being directed at a substantial angle to the orientation of said first outlet means in the manner to supply secondary air for flow paths that are generally parallel with said film line axis.

12. The device of claim 2, wherein the annular air shroud outlet means are spaced radially outward from the base region of the bubble a first distance of at least six inches.

13. The device of claim 12, wherein said first distance is at least one foot.

14. The device of claim 2, wherein the spacing between said air shroud outlet means and the bubble is sufficiently large in the presence of the combined flows from the air cooling means and said air shroud device to prevent air acceleration and related bernoulli effects from creating any substantial tendency for the bubble to be drawn outwardly toward the air shroud device.

15. The device of claims 1 or 2, wherein said annular air shroud outlet means of said air shroud device are sized to supply a substantial volume of air adequate to meet the flow inducing effects of the cooling air flow from the air cooling means.

16. The device of claim 15 wherein the aggregate flow of the annular air shroud outlet means of said air shroud device is at least equal to the aggregate flow of the annular cooling air outlet means of said air cooling means.

17. The device of claim 3, including feedback control means for providing a signal indicative of the shape of the bubble and then operating the means to adjustably vary the air pressure to control the shape of the bubble.

18. The device of claims 1 or 2, wherein said source or air for said air shroud device is positioned to receive air uninfluenced by variable conditions at the extrusion line.

19. The device of claim 2, wherein said source of circumferentially uniform air includes an air shroud plenum separate from said air cooling means.

* * * * *